(12) United States Patent
Yokoyama et al.

(10) Patent No.: US 9,124,501 B2
(45) Date of Patent: Sep. 1, 2015

(54) SERVER DEVICE, NETWORK DEVICE, AND METHOD OF PROVIDING DATA PROVIDING LOCATION

(75) Inventors: Atsushi Yokoyama, Kanagawa (JP); Yukinari Hirose, Kanagawa (JP); Shinichiro Ozeki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 923 days.

(21) Appl. No.: 11/958,061

(22) Filed: Dec. 17, 2007

(65) Prior Publication Data

US 2008/0155085 A1    Jun. 26, 2008

(30) Foreign Application Priority Data

Dec. 26, 2006    (JP) .................... 2006-350481

(51) Int. Cl.
| | |
|---|---|
| H04L 12/24 | (2006.01) |
| G06F 15/173 | (2006.01) |
| H04W 4/02 | (2009.01) |
| H04W 4/20 | (2009.01) |
| H04L 29/08 | (2006.01) |
| G06F 17/30 | (2006.01) |

(52) U.S. Cl.
CPC ............... *H04L 41/12* (2013.01); *H04L 67/18* (2013.01); *H04W 4/02* (2013.01); *H04W 4/20* (2013.01); *G06F 17/30* (2013.01)

(58) Field of Classification Search
CPC ................. G06F 17/30; H04L 41/12
See application file for complete search history.

(56) References Cited

U.S. PATENT DOCUMENTS

| | | | | |
|---|---|---|---|---|
| 6,804,233 | B1 * | 10/2004 | Congdon et al. | 370/389 |
| 2002/0143953 | A1 * | 10/2002 | Aiken, Jr. | 709/227 |
| 2003/0163548 | A1 * | 8/2003 | Stickler | 709/218 |
| 2004/0246520 | A1 * | 12/2004 | Obert | 358/1.15 |
| 2005/0268144 | A1 * | 12/2005 | Doering et al. | 713/600 |
| 2005/0289103 | A1 * | 12/2005 | Bier | 707/1 |
| 2006/0018444 | A1 * | 1/2006 | Pantana et al. | 379/88.17 |
| 2006/0033950 | A1 | 2/2006 | Nakamura | |
| 2006/0173985 | A1 * | 8/2006 | Moore | 709/223 |

(Continued)

FOREIGN PATENT DOCUMENTS

| | | |
|---|---|---|
| JP | 3-263941 | 11/1991 |
| JP | 11-161584 | 6/1999 |
| JP | 2001-14026 | 1/2001 |
| JP | 2004-78392 | 3/2004 |
| JP | 2005-94376 | 4/2005 |
| JP | 2005-149382 | 6/2005 |

(Continued)

OTHER PUBLICATIONS

Jul. 12, 2011 Japanese official action in connection with a counterpart Japanese patent application.

*Primary Examiner* — Suraj Joshi
(74) *Attorney, Agent, or Firm* — Cooper & Dunham LLP

(57) ABSTRACT

A server device that provides a client device with one or more data storage locations of one or more sets of information about one or more datasets. The one or more sets of information about the one or more datasets are to be provided by one or more network devices. Each of the sets of information about the datasets is described in a structured format. The server device includes a data storage location acquiring unit that acquires the data storage locations of the sets of information about the datasets from the corresponding network devices, a data storage location management unit that manages the acquired data storage locations of the sets of information about the datasets; and a data storage location providing unit that provides the client device with the acquired data storage locations of the sets of information about the datasets.

11 Claims, 23 Drawing Sheets

(56) References Cited

U.S. PATENT DOCUMENTS

| | | | |
|---|---|---|---|
| 2006/0277291 A1* | 12/2006 | Misbach | 709/224 |
| 2007/0067831 A1* | 3/2007 | Matsuda et al. | 726/5 |
| 2008/0008197 A1* | 1/2008 | Sakanashi et al. | 370/401 |
| 2008/0034046 A1* | 2/2008 | DiPlacido et al. | 709/206 |
| 2008/0109529 A1* | 5/2008 | Story | 709/217 |

FOREIGN PATENT DOCUMENTS

| | | |
|---|---|---|
| JP | 2006-54732 | 2/2006 |
| JP | 2006-163901 | 6/2006 |
| JP | 2006-221419 | 8/2006 |
| JP | 2006-260422 | 9/2006 |
| JP | 2006-340074 | 12/2006 |

* cited by examiner

FIG.14

HTTP GET

GET /rss/url.html HTTP/1.1
Host: 169.96.228.88
Connection: Keep-Alive

RSS URL

HTTP/1.1 200 OK
Date: Thu, 25 Jul 2002 14:49:01 GMT
Server: Apache/1.3.24 (Unix) mod_ssl/2.8.8 OpenSSL/0.9.6d PHP/4.1.2
Last-Modified: Fri, 14 Dec 2001 05:09:32 GMT
ETag: "45aa-707-3c19898c"
Accept-Ranges: bytes
Content-Length: 1799
Connection: close
Content-Type: text/html http://169.96.228.88/rssurl.html

FIG.25

```
<?xml version="1.0" encoding="utf-8" ?>
<opml version="1.0">
<head>
<title>RSS Server</title>
<dateCreated>2006-06-15 10:17:25</dateCreated>
<dateModified>2006-06-15 10:17:25</dateModified>
</head>
<body>
<outline text="imagio Neo c-350" expand="true">
    <outline type="rss" text="DEVICE STATUS" title="DEVICE STATUS" xmlUrl="http://192.168.1.1/rss/machine.xml"
        htmlUrl="http://192.168.1.1/" />
    <outline type="rss" text="TONER LEVEL" title="TONER LEVEL" xmlUrl="http://192.168.1.1/rss/toner.xml"
        htmlUrl="http://192.168.1.1/" />
    <outline type="rss" text="PAPER FEED TRAY STATUS" title="PAPER FEED TRAY STATUS" xmlUrl="http://192.168.1.1/rss/tray.xml"
        htmlUrl="http://192.168.1.1/" />
    <outline type="rss" text="COMMUNICATION HISTORY" title="COMMUNICATION HISTORY" xmlUrl="http://192.168.1.1/rss/journal.xml"
        htmlUrl="http://192.168.1.1/journal.cgi" />
</outline>
<outline text="imagio Neo c-450" expand="true">
    <outline type="rss" text="DEVICE STATUS" title="DEVICE STATUS" xmlUrl="http://192.168.1.2/rss/machine.xml"
        htmlUrl="http://192.168.1.2/" />
    <outline type="rss" text="TONER LEVEL" title="TONER LEVEL" xmlUrl="http://192.168.1.2/rss/toner.xml"
        htmlUrl="http://192.168.1.2/" />
    <outline type="rss" text="PAPER FEED TRAY STATUS" title="PAPER FEED TRAY STATUS" xmlUrl="http://192.168.1.2/rss/tray.xml"
        htmlUrl="http://192.168.1.2/" />
    <outline type="rss" text="COMMUNICATION HISTORY" title="COMMUNICATION HISTORY" xmlUrl="http://192.168.1.2/rss/journal.xml"
        htmlUrl="http://192.168.1.2/journal.cgi" />
</outline>
<outline text="imagio Neo c-550" expand="true">
    <outline type="rss" text="DEVICE STATUS" title="DEVICE STATUS" xmlUrl="http://192.168.1.3/rss/machine.xml"
        htmlUrl="http://192.168.1.3/" />
    <outline type="rss" text="TONER LEVEL" title="TONER LEVEL" xmlUrl="http://192.168.1.3/rss/toner.xml"
        htmlUrl="http://192.168.1.3/" />
    <outline type="rss" text="PAPER FEED TRAY STATUS" title="PAPER FEED TRAY STATUS" xmlUrl="http://192.168.1.3/rss/tray.xml"
        htmlUrl="http://192.168.1.3/" />
    <outline type="rss" text="COMMUNICATION HISTORY" title="COMMUNICATION HISTORY" xmlUrl="http://192.168.1.3/rss/journal.xml"
        htmlUrl="http://192.168.1.3/journal.cgi" />
</outline>
</body>
</opml>
```

- RSS FEEDS OF NETWORK DEVICE N
- RSS FEEDS OF NETWORK DEVICE N+1
- RSS FEEDS OF NETWORK DEVICE N+2

FIG.28

| +COMPANY NEWS | | COMPANY NEWS | XX/XX NOTICE OF POWER INTERRUPTION |
|---|---|---|---|
| +imagio Neo c-350 | | imagio Neo c-450 | TONER NEAR END (CYAN) |
| +imagio Neo c-450 | | ECONOMIC NEWS | CURRENT EXCHANGE RATE |
| +imagio Neo c-550 | | imagio Neo c-350 | TORAY 1 (A4) OUT OF PAPER |
| +ECONOMIC NEWS | | | |
| +IT NEWS | | | |

SERVER DEVICE, NETWORK DEVICE, AND METHOD OF PROVIDING DATA PROVIDING LOCATION

BACKGROUND

1. Technical Field

This disclosure generally relates to a server device, a network device, a method of providing a data providing location, a program for providing a data providing location, and a recording medium, and particularly relates to a server device, a network device, a method of providing a data providing location, a program for providing a data providing location, and a recording medium for use in a system in which a client device acquires a set of information about a dataset from a data storage location.

2. Description of the Related Art

In recent years, RSS (Rich Site Summary) has been used for publishing updated information of Web sites. RSS is an XML (Extensible Markup Language) based format for describing metadata such as title and summary of a Web site in a structured manner.

Updated information written in RSS can contain titles, addresses, headings, summaries, updated time, etc., of Web site pages. RSS makes it possible for RSS subscribers to efficiently handle the updated information on many Web sites in a uniform format.

Some conventional multifunction machines have functions for providing device management information, such as communication histories, in RSS (see Japanese Patent Laid-Open Publication No. 2006-54732 (Patent Document 1), also published as U.S. Application Publication No. 2006/0033950 A1). Patent Document 1 discloses an RSS reader that runs on a computer serving as a client device. The RSS reader periodically polls RSS feeds in plural multifunction machines and thus collectively manages plural sets of device management information of the plural multifunction machines.

The term "RSS feed" as used herein may indicate the URL of the RSS source. The RSS source is information described in RSS format.

However, according to Patent Document 1, a user of the RSS reader needs to register RSS feeds of the multifunction machines into the RSS reader. That is, the user needs to find out each of the URLs of the RSS feeds of the multifunction machines. This might be very troublesome if the user needs to register a number of RSS URLs.

Similarly, in the case where an administrator, such as an IT manager, manages a number of network devices and multifunction machines, the administrator needs to find out and register all the RSS feed URLs of the managed network devices and multifunction machines, which might be very troublesome.

BRIEF SUMMARY

In an aspect of this disclosure, there is provided view a server device capable of correctly and easily registering a data storage location indicating the location of a set of information about a dataset provided by a network device; the network device; and a method of providing a data providing location.

In another aspect, there is provided a server device that provides a client device with one or more data storage locations of one or more sets of information about one or more datasets. The one or more sets of information about the one or more datasets are provided by one or more network devices. Each of the sets of information about the datasets is described in a structured format. The server device comprises a data storage location acquiring unit that acquires the data storage locations of the sets of information about the datasets from the corresponding network devices; a data storage location management unit that manages the data storage locations of the sets of information about the datasets acquired from the network devices; and a data storage location providing unit that provides the client device with the acquired data storage locations of the sets of information about the datasets.

According to another aspect, there is provided a network device that provides a set of information about a dataset described in a structured format. The network device comprises a specifying unit that specifies a server device that provides a client device with a data storage location of the set of information about the dataset; and a providing unit that provides the server device specified by the specifying unit with the data storage location of the set of information about the dataset.

Embodiments of the present invention include a method, a device, a system, a computer program, a recording medium, and a data structure to which an element or an arbitrary combination of elements of the present invention is applied.

Embodiments of the present invention can provide a server device capable of correctly and easily registering a data storage location of a set of information about a dataset provided from a network device; the network device; and a method of providing a data providing location.

BRIEF DESCRIPTION OF THE DRAWINGS

FIG. 14 is a diagram showing exemplary configurations of REST information items exchanged between a network device and a server device;

FIG. 25 is an example of RSS feeds acquired from plural network devices and stored in an OPML format;

FIG. 28 illustrates an example of a screen displayed by an RSS reader, showing an RSS feed provided by a server device.

DETAILED DESCRIPTION OF THE PREFERRED EMBODIMENT

Preferred embodiments of the present invention are described below with reference to the accompanying drawings. In the examples illustrated in the following embodiments, an IT manager as an administrator of plural network devices, such as multifunction devices, which are capable of providing device management information as RSS feeds, registers URLs of the RSS feeds of the network devices. The following embodiments provide a technique for facilitating registration of the URLs of the RSS feeds provided by the plural network devices into an RSS reader of a client device.

Figure 1:
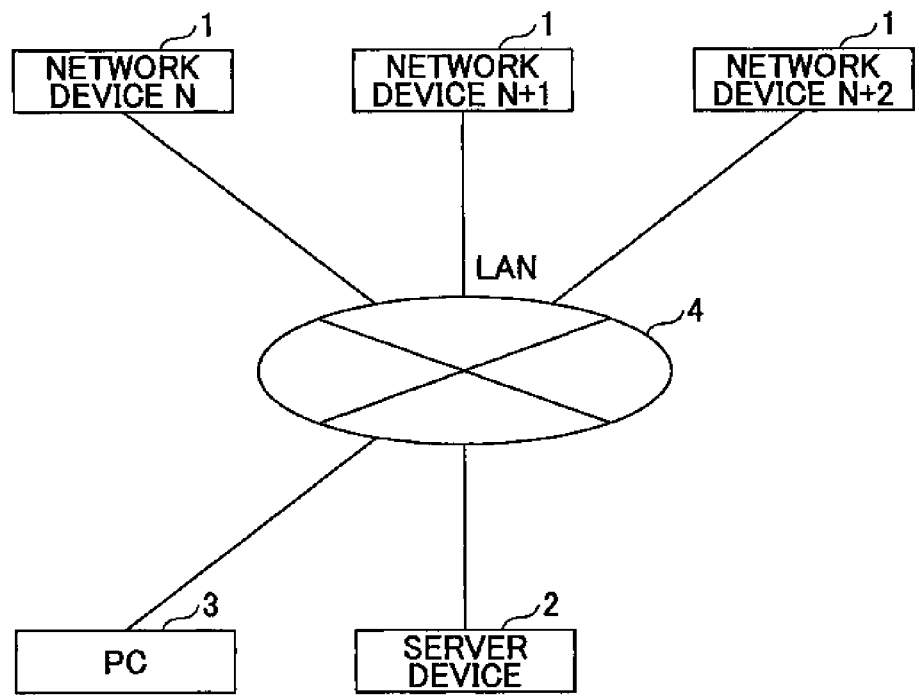
FIG. 1 is a schematic diagram showing a configuration of a system according to an embodiment of the present invention.

FIG. 1 is a schematic diagram showing a configuration of a system according to an embodiment of the present invention. The system shown in FIG. 1 includes one or more network devices 1, a server device 2, and a PC (client device) 3, which are connected through a LAN 4. The PC 3 is used by an IT manager. The PC 3 has a Web browser, an RSS reader, etc., installed therein and available for use. The LAN 4 may be replaced with a WAN, the Internet, or the like.

Figure 2:
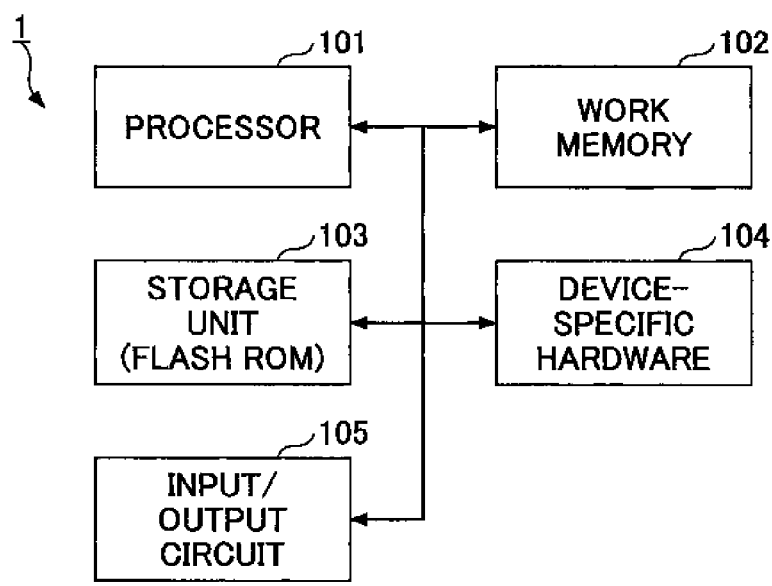
FIG. 2 is a block diagram showing a hardware configuration of a network device according to an embodiment.

FIG. 2 is a block diagram showing a hardware configuration of the network device 1 according to an embodiment. The network device 1 includes a processor 101, a work memory 102, a storage unit 103 such as a flash ROM, device-specific hardware 104, and an input/output circuit 105.

The processor 101 controls the network device 1. More specifically, the processor 101 executes functions that are specific to the network device 1 in combination with the device-specific hardware 104. The processor 101 is also used for executing Web server functions in the network device 1.

The work memory 102 is used for executing software and also used as a temporary storage area for associated operations. The storage unit 103 is an electrically rewritable storage medium such as a flash ROM. The storage unit 103 stores software, such as a control program for realizing the functions of the network device 1 and a program of an embodiment of the present invention. The device-specific hardware 104 is specific to the network device 1. The input/output circuit 105 is used for connecting to the LAN 4.

Figure 3:
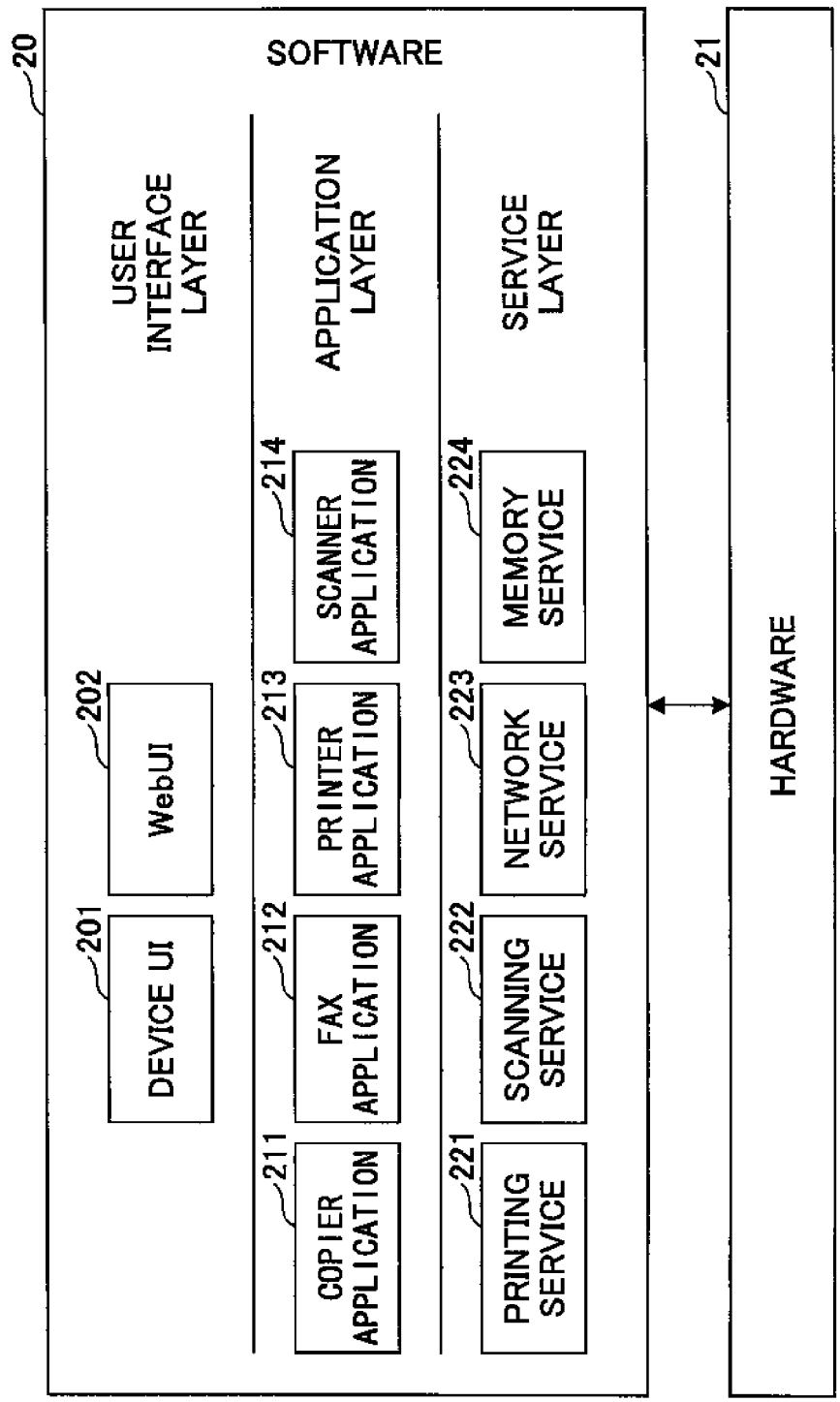
FIG. 3 is a block diagram showing a software configuration of a network device according to an embodiment.

FIG. 3 is a block diagram showing a software configuration of the network device 1 according to an embodiment. Referring to FIG. 3, the network device 1 includes software 20 and hardware 21.

The software 20 includes a user interface layer, an application layer, and a service layer. The user interface layer provides users with user interfaces. The application layer provides application functions. The service layer controls the hardware 21 to provide each of the applications with their specific functions.

The user interface layer includes device user interface (UI) 201 and a Web UI 202. The device UI 201 provides an operations panel of the network device 1 with user interfaces. The Web UI 202 provides a user of the network device 1 with user interfaces for operating the network device 1 from a Web browser of, e.g., the PC 3.

The application layer includes a copier application 211, a fax application 212, a printer application 213, and a scanner application 214. The copier application 211 provides copier functions. The fax application 212 provides fax functions. The printer application 213 provides printer functions. The scanner application 214 provides scanner functions.

The service layer includes a printing service 221, a scanning service 222, a network service 223, and a memory service 224. The printing service 221 controls a plotter unit included in the hardware 21. The scanning service 222 controls a scanning unit included in the hardware 21. The network service 223 controls the input/output circuit 105. The memory service 224 manages the work memory 102.

For example, if a user gives an instruction to make a photocopy of an original document using the operations panel of the network device 1, the device UI 201 first receives the instruction from the user. Then, the device UI 201 provides an instruction of a copy operation to the copier application 211. According to the copy operation instruction from the device UI 201, the copier application 211 instructs the scanning service 222 to scan the original document and the printing service 221 to perform a printing operation. Thus the user can obtain a copy of the original document.

Figure 4:
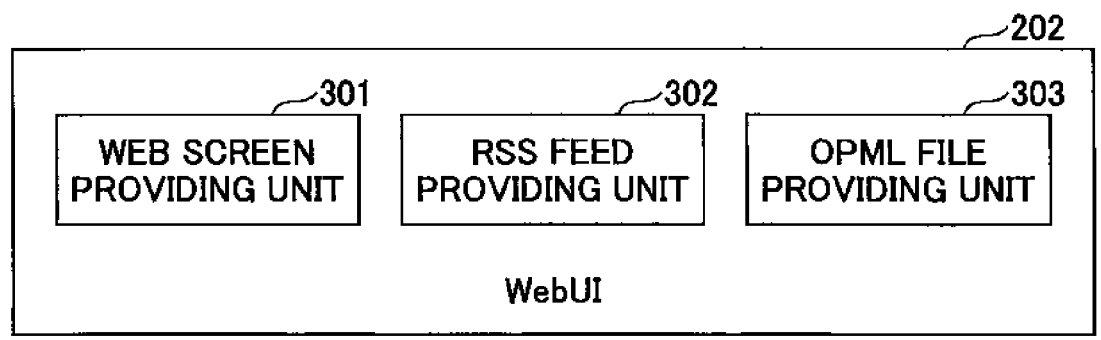
FIG. 4 is a block diagram showing a configuration of a Web UI according to an embodiment.

FIG. 4 is a block diagram showing a configuration of the Web UI 202 according to an embodiment. The Web UI 202 of FIG. 4 includes a Web screen providing unit 301, an RSS feed providing unit 302, and an OPML file providing unit 303.

The Web screen providing unit 301 receives, through the network service 223, a request from the Web browser of the PC 3 being used by a user. The Web screen providing unit 301 is configured to send, based on the received request, a Web page containing device management information to the PC 3, thereby providing the Web page to the user.

The device management information may include various types of information items such as device status, energy-saving status, error status, toner level, paper feed tray status, and job history. Although these device management information items may be provided on a single Web page, they are usually provided on different Web pages according to the types of the information items. For example, the Web pages may include a Web page, as a top page, indicating general device status such as device status, energy-saving status, and error generating status; and another Web page indicating job history information.

The RSS feed providing unit 302 receives, through the network service 223, a request from the RSS reader running on the PC 3 being used by a user. The RSS feed providing unit 302 is configured to, based on the received request, send an RSS feed containing the device management information to the PC 3, thereby providing the RSS feed to the user.

More specifically, the information contained in the RSS feed includes summaries of the device management information items and links to Web pages that provide details of the device management information items. Generally, the information displayed by the RSS reader used by the user includes the summaries of the device management information items. To see the details of one of the device management information item, the user follows the corresponding link, which is displayed on the RSS reader, to the Web page containing the details of the information item, and displays the Web page provided by the Web screen providing unit 301 by using the Web browser or a Web browser function of the RSS reader.

As in the case of the Web pages described above, the information items to be provided in the form of RSS feed may be provided in a single RSS feed. However, an RSS feed containing different types of information items is not convenient for users. Moreover, RSS readers usually have a function for remixing contents of plural RSS feeds and displaying the remixed contents. It is therefore preferable that the information items be provided in different RSS feeds according to the types of the information items, thereby allowing the user to use his/her desired utilization method.

The OPML file providing unit 303 is configured to provide, through the network service 223, an OPML file containing a list of all the RSS feeds of the RSS feed providing unit 302. The URL of the OPML file may be hereinafter referred to as the OPML feed. The contents of the OPML file may be hereinafter referred to as the OPML source.

Figure 5:
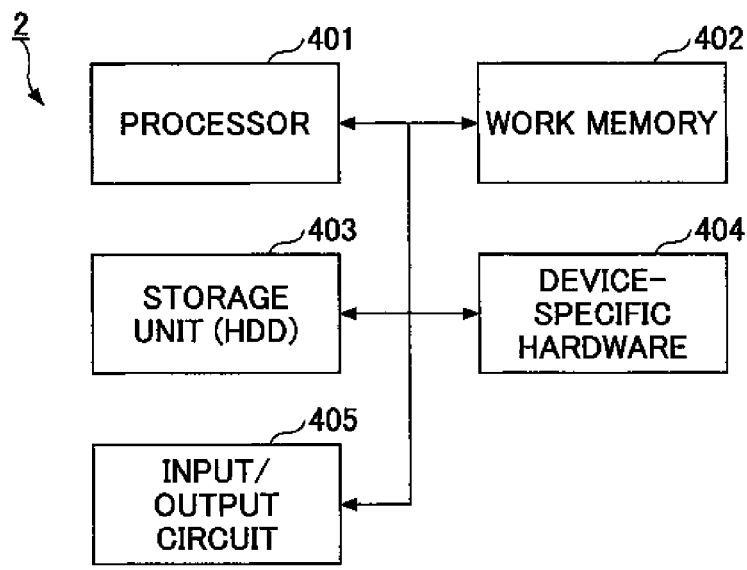
FIG. 5 is a block diagram showing a hardware configuration of a server device according to an embodiment.

FIG. 5 is a block diagram showing a hardware configuration of the server device 2 according to an embodiment. The server device 2 includes a processor 401, a work memory 402, a storage unit 403 such as a hard disk drive, device-specific hardware 404, and an input/output circuit 405.

The processor 401 controls the server device 2. More specifically, the processor 401 executes functions that are specific to the server device 2 in combination with the device-specific hardware 404. The processor 401 is also used for executing Web server functions in the server device 2.

The work memory 402 is used for executing software read from the storage unit 403 and also used as a temporary storage area for associated operations. The storage unit 403 is a rewritable storage medium such as an HDD. The storage unit 403 stores software, such as a control program for realizing the functions of the server device 2 and a program of an embodiment of the present invention. The device-specific hardware 404 is specific to the server device 2. The input/output circuit 405 is used for connecting to the LAN 4.

Figure 6:
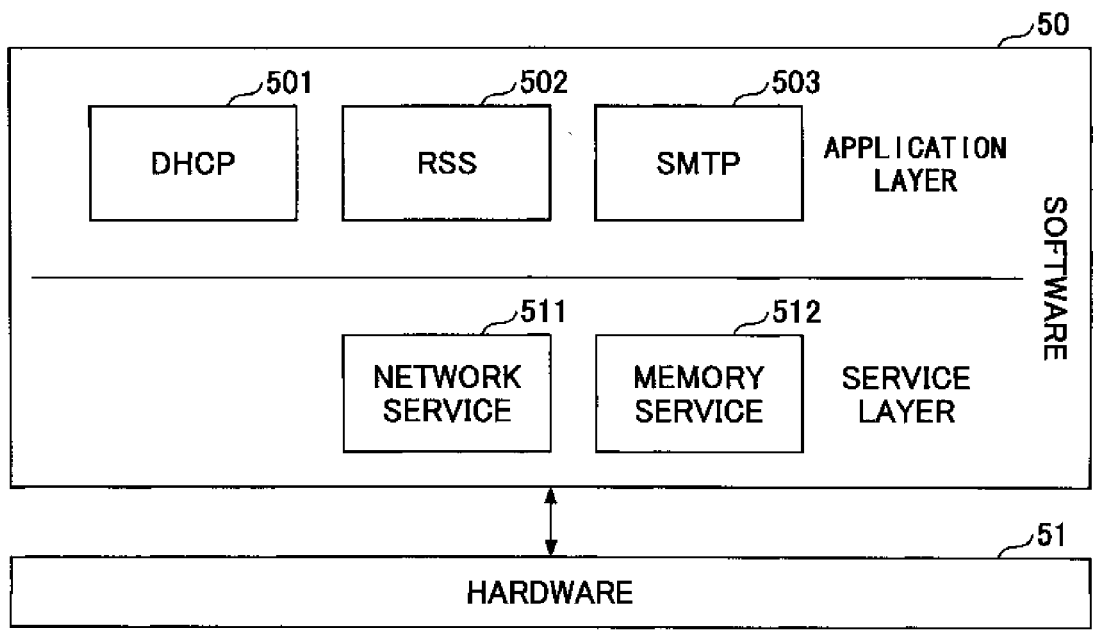
FIG. 6 is a block diagram showing a software configuration of a server device according to an embodiment.

FIG. 6 is a block diagram showing a software configuration of the server device 2 according to an embodiment. Referring to FIG. 6, the server device 2 includes software 50 and hardware 51.

The software 50 includes an application layer and a service layer. The application layer provides application functions. The service layer controls the hardware 51 to provide each of the applications with their specific functions.

The application layer includes a DHCP application 501, an RSS application 502, and an SMTP application 503. The DHCP application 501 provides DHCP functions. The RSS application 502 provides RSS functions. The SMTP application 503 provides mail receiving functions.

The service layer includes a network service 511 and a memory service 512. The network service 511 controls the input/output circuit 405. The memory service 512 manages the work memory 402.

Figure 7:
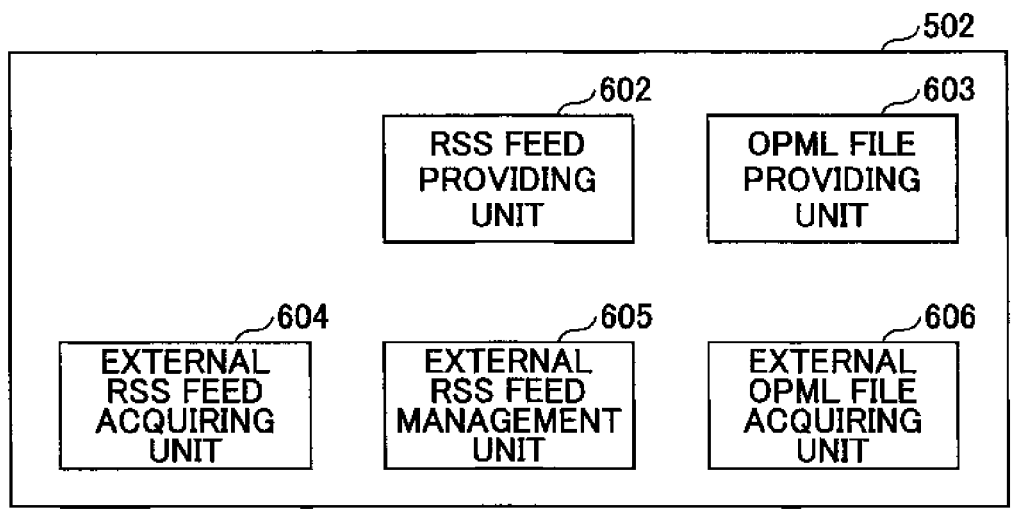
FIG. 7 is a block diagram showing a configuration of an RSS application according to an embodiment.

FIG. 7 is a block diagram showing a configuration of the RSS application 502 according to an embodiment. The RSS application 502 of FIG. 7 includes an RSS feed providing unit 602, an OPML file providing unit 603, an external RSS feed acquiring unit 604, an external RSS feed management unit 605, and an external OPML file acquiring unit 606.

The RSS feed providing unit 602 receives, through the network service 511, a request from the RSS reader running on the PC 3 being used by a user. The RSS feed providing unit 602 is configured to send, based on the received request, an RSS feed containing device management information to the PC 3, thereby providing the RSS feed to the user.

More specifically, the RSS feed contains summaries of the device management information items and links to Web pages that provide details of the device management information items. Generally, the information displayed by the RSS reader used by the user includes the summaries of the device management information items. To see the details of one of the device management information items, the user follows the corresponding link, which is displayed on the RSS reader, to the Web page containing the details of the information item, and displays the Web page provided by the Web screen providing unit 301 of the network device 1 by using the Web browser or a Web browser function of the RSS reader.

As in the case of the Web pages described above, the information items to be provided in the form of RSS feed may be provided in a single RSS feed. However, an RSS feed containing different types of information items is not convenient for users. Moreover, RSS readers usually have a function for remixing contents of plural RSS feeds and displaying the remixed contents. It is therefore preferable that the information items be provided in different RSS feeds according to the types of the information items, thereby allowing the user to use his/her desired utilization method.

The OPML file providing unit 603 is configured to provide, through the network service 511, an OPML file containing a list of all the RSS feeds to be provided by the RSS feed providing unit 602. The URL of the OPML file may be hereinafter referred to as the OPML feed. The contents of the OPML file may be hereinafter referred to as the OPML source.

The external RSS feed acquiring unit 604 is configured to acquire an RSS feed containing device management information from the network device 1 on the LAN 4 through the network service 511.

The external RSS feed management unit 605 is configured to hold the RSS feed acquired by the external RSS feed acquiring unit 604 and provide the RSS feed to the RSS feed providing unit 602.

The external OPML file acquiring unit 606 is configured to acquire, through the network service 511, an OPML file containing a list of all the RSS feeds of the network device 1 on the LAN 4. The external OPML acquiring unit 606 is also configured to provide information of the RSS feeds contained in the OPML file to the external RSS feed acquiring unit 604.

In an embodiment of the present invention the network devices 1, which are connected to the LAN 4 and are to be managed by the IT managers automatically register their RSS feeds into the server device 2. That is, the RSS feeds of the network devices 1 are collected into the server device 2. The IT manager can register the RSS feeds of the plural network devices 1 by accessing the server device 2.

By providing the server device 2 with a protocol server function necessary for the usual network device 1, the network device 1 to be managed can, without having any special functions, specify the server device 2 as the destination to which the network device 1 reports its RSS URL as described below.

(Specifying the Server Device 2)

Figure 8:
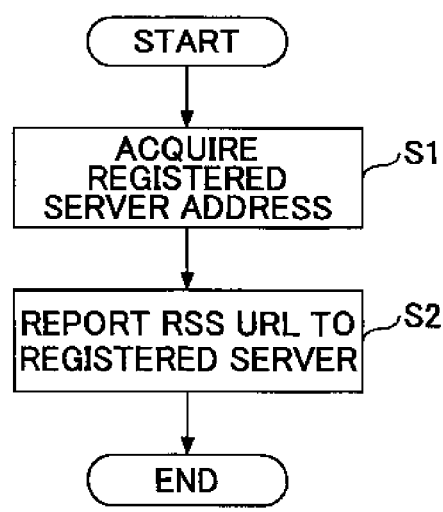
FIG. 8 is a flowchart showing an exemplary procedure for a network device to report an RSS URL to a server device.

FIG. 8 is a flowchart showing an exemplary procedure for the network device 1 to report its RSS URL to the server device 2. The procedure shown in the flowchart of FIG. 8 is executed when the network device 1 is started; when registering or changing the address of a registered server device (the registered server address, in this case the address of the server device 2); or when a certain time has passed from the last time the network device 1 reported its RSS URL.

In Step S1, the network service 223 of the network device 1 reads out the registered server address from the storage unit 103. In Step S2 the network service 223 reports the RSS URL of the network device 1 to the server device 2 corresponding to the registered server address from the input/output circuit 105 through the LAN 4. In this way, based on the registered server address, the network device 1 specifies the server device 2.

Figure 9:
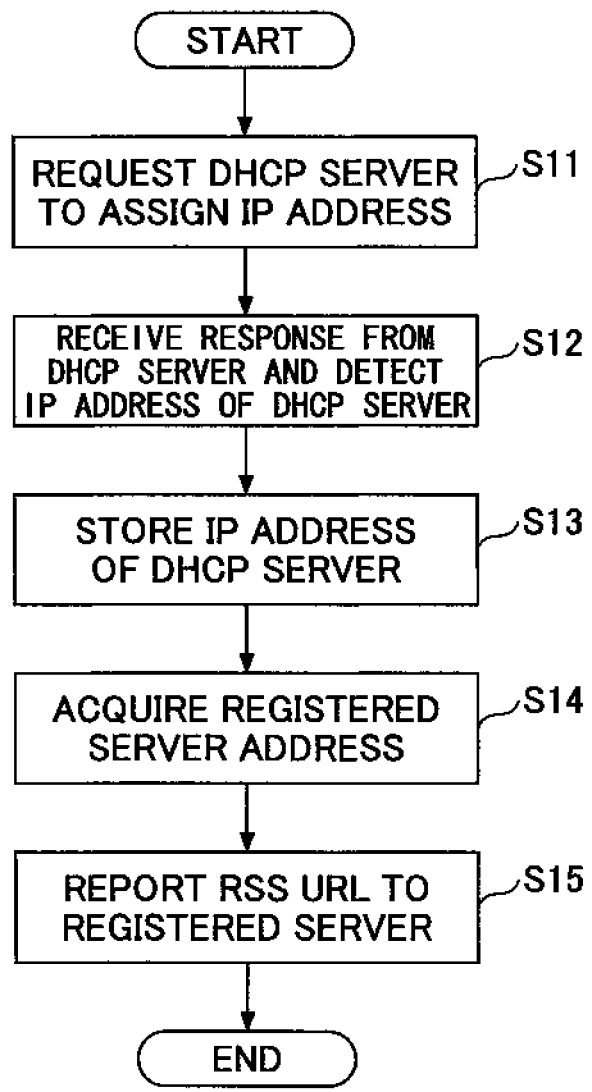
FIG. 9 is a flowchart showing another exemplary procedure for a network device to report an RSS URL to a server device.

FIG. 9 is a flowchart showing another exemplary procedure for the network device 1 to report its RSS URL to the server device 2. In this example, the server device 2 is a DHCP server. The procedure shown in the flowchart of FIG. 9 is executed when the network device 1 is started; or when half of the lease term of an IP address, which has been assigned to the network device 1 by the server device 2, has passed.

In Step S11 the network service 223 of the network device 1 requests a DHCP server, i.e., the server device 2, to assign an IP address to the network device 1 from the input/output circuit 105 through the LAN 4. In Step S12 the network service 223 receives a response indicating an IP address assignment result from the server device 2 through the LAN 4 and detects an IP address of the server device 2 from the response. In Step S13 the network service 223 stores, as a registered server address, the detected IF address of the server device 2 in the storage unit 103.

In Step S14 the network service 223 of the network device 1 reads out the registered server address from the storage unit 103. In Step S15 the network service 223 reports the RSS URL of the network device 1 to the server device 2 corresponding to the registered server address from the input/output circuit 105 through the LAN 4. In this way, the network device 1 specifies the DHCP server that assigns an IF address to the network device 1, i.e., the server device 2.

Figure 10:
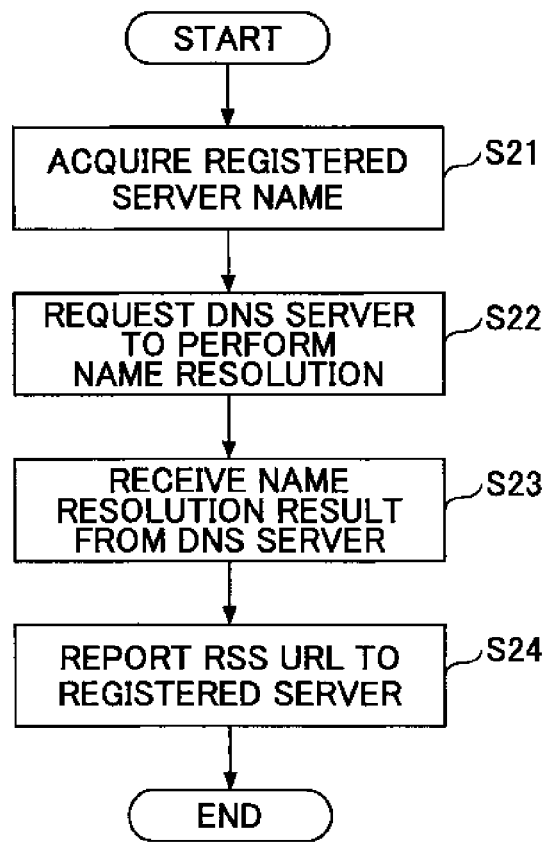
FIG. 10 is a flowchart showing still another exemplary procedure for a network device to report an RSS URL to a server device.

FIG. 10 is a flowchart showing still another exemplary procedure for the network device 1 to report its RSS URL to the server device 2. The procedure shown in the flowchart of FIG. 10 is executed when the network device 1 is started; when registering or changing a registered server address; or when a certain time has passed from the last time the network device 1 reported its RSS URL.

In Step S21 the network service 223 reads out the name of a registered server device (the registered server name, in this case the name of the server device 2) from the storage unit 103.

In Step S22 the network service 223 requests a DNS server to perform name resolution.

In Step S23 the network service 223 receives a name resolution result from the DNS server through the LAN 4 and thus acquires an IP address of the server device 2.

In Step S24 the network service 223 of the network device 1 reports the RSS URL of the network device 1 to the server device 2 corresponding to the acquired IP address from the input/output circuit 105 through the LAN 4. In this way, based on the registered server name, the network device 1 resolves the name by querying the DNS server and specifies the server device 2.

(Sending an RSS URL from the Network Device 1 to the Server Device 2)

Figure 11:
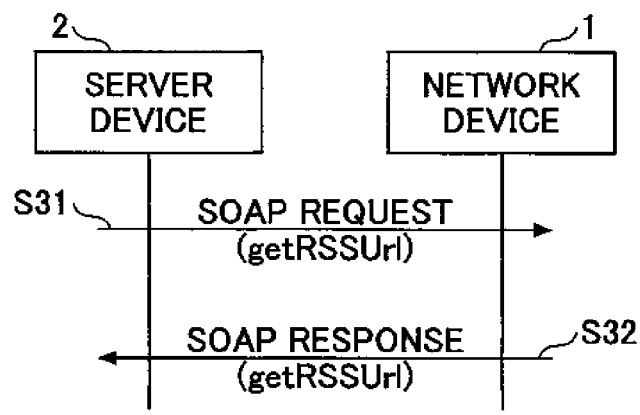
FIG. 11 is a sequence diagram showing an exemplary procedure for sending an RSS URL from a network device to a server device.

FIG. 11 is a sequence diagram showing an exemplary procedure for sending an RSS URL from the network device 1 to the server device 2. A Web service is activated in the network device 1 in order to send the RSS URL.

The server device 2 executes the operation shown in the sequence diagram of FIG. 11 when detecting the network device 1 (when receiving an ARP request or a request of IP address assignment according to DHCP protocol).

In Step S31 the server device 2 sends a method "getRSSUrl" for acquiring the RSS URL of the network device 1 as a SOAP request. In Step S32 the network device 1 returns a SOAP response as a response to the SOAP request. The SOAP response contains the RSS URL of the network device 1.

Figure 12:
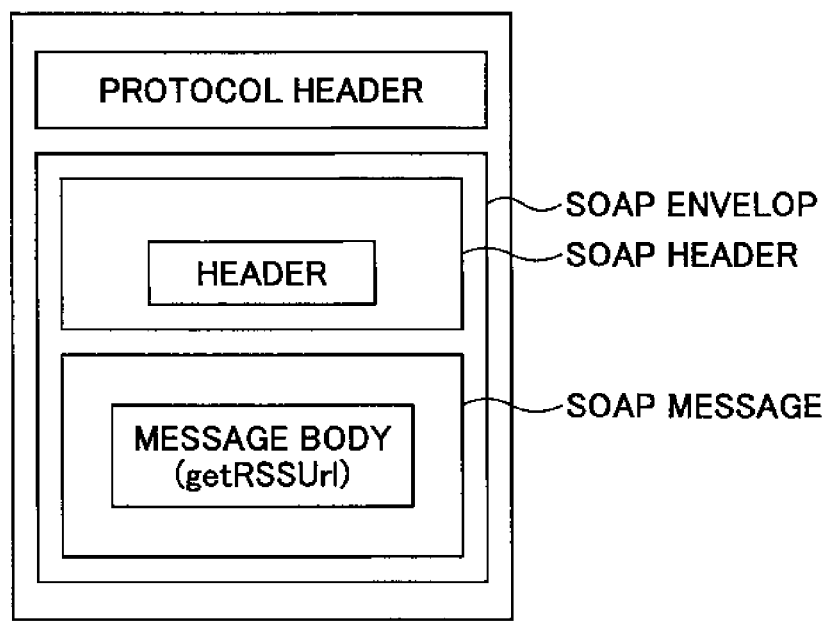
FIG. 12 is a diagram showing an example of a configuration of SOAP information exchanged between a network device and a server device.

FIG. 12 is a diagram showing an example of a configuration of SOAP information exchanged between the network device 1 and the server device 2. The SOAP information includes a protocol header and a SOAP envelop. The SOAP envelop includes a SOAP header and a SOAP message. The method "getRSSUrl" is contained in the message body of the SOAP message.

In this way the RSS URL can be sent from the network device 1 to the server device 2 using a SOAP I/F.

Figure 13:
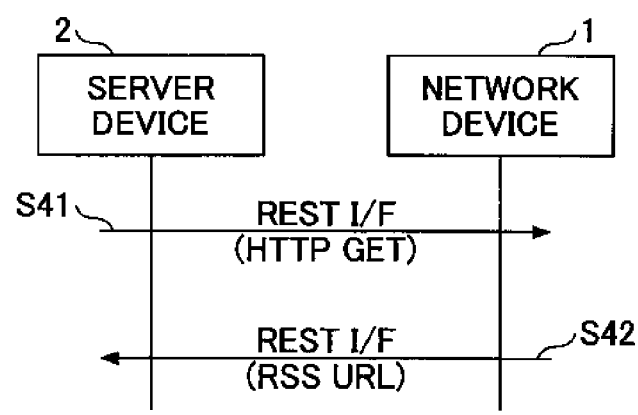
FIG. 13 is a sequence diagram showing another exemplary procedure for sending an RSS URL from a network device to a server device.

FIG. 13 is a sequence diagram showing another exemplary procedure for sending an RSS URL from the network device 1 to the server device 2. A REST I/F analysis module is activated in the network device 1 in order to send the RSS URL.

The server device 2 executes the procedure shown in the sequence diagram of FIG. 13 when detecting the network device 1 (when receiving an ARP request or a request of IP address assignment according to DHCP protocol). The procedure shown in FIG. 13 is based on HTTP, which is a representative example of a REST I/F architecture implementation. In this example, HTTP GET is used for acquiring the RSS URL.

In Step S41 the server device 2 sends HTTP GET. In Step S42 the network device 1 returns an RSS URL of the network device 1 as a response to HTTP GET. FIG. 14 is a diagram showing exemplary configurations of REST information items exchanged between the network device 1 and the server device 2. The REST information item of FIG. 14 sent by the network device 1 contains an RSS URL "http://169.96.228.88/rssurl.html".

In this way the RSS URL can be sent from the network device 1 to the server device 2 using a REST I/F.

Figure 15:
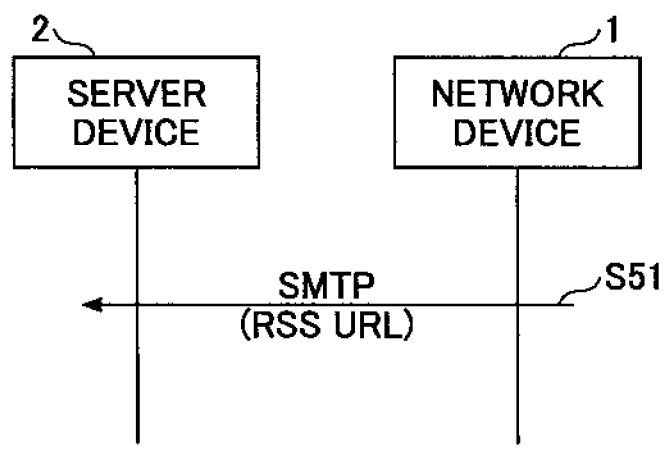
FIG. 15 is a sequence diagram showing still another exemplary procedure for sending an RSS URL from a network device to a server device.

FIG. 15 is a sequence diagram showing still another exemplary procedure for sending an RSS URL from the network device 1 to the server device 2. The procedure shown in the sequence diagram of FIG. 15 is used in Step S2 of FIG. 8 or Step S15 of FIG. 9. An SMTP server is activated in the server device 2 in order to receive the RSS URL.

Figure 16:
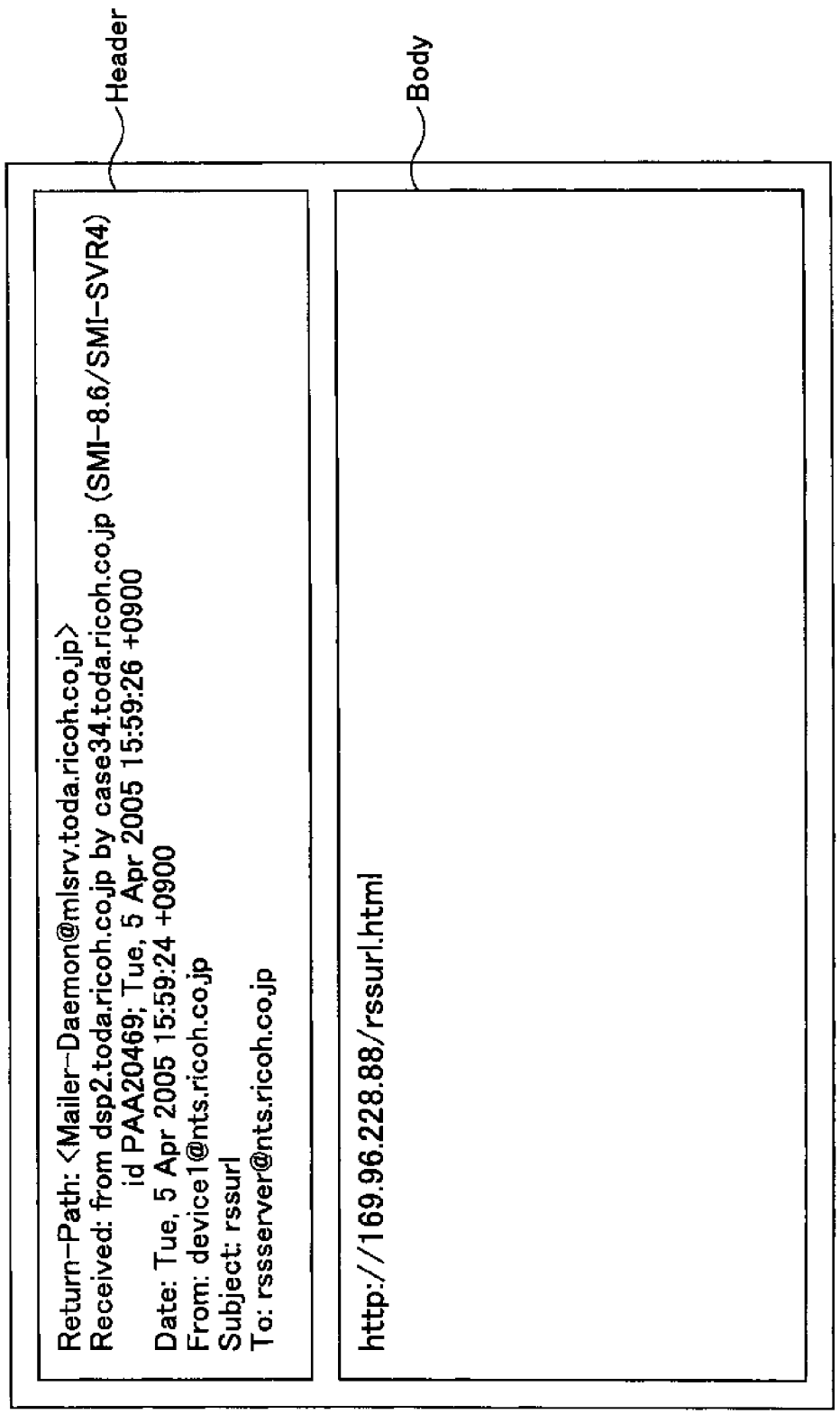
FIG. 16 is a diagram showing an example of a configuration of mail information sent from a network device to a server device.

In Step S51 the network device 1 sends the RSS URL to the server device 2 based on SMTP. FIG. 16 is a diagram showing an example of a configuration of mail information sent from the network device 1 to the server device 2. The mail information shown in FIG. 16 contains an RSS URL "http://169.96.228.88/rssurl.html" in the body of the mail.

In this way the RSS URL can be sent from the network device 1 to the server device 2 in the body of mail based on SMTP.

Figure 17:
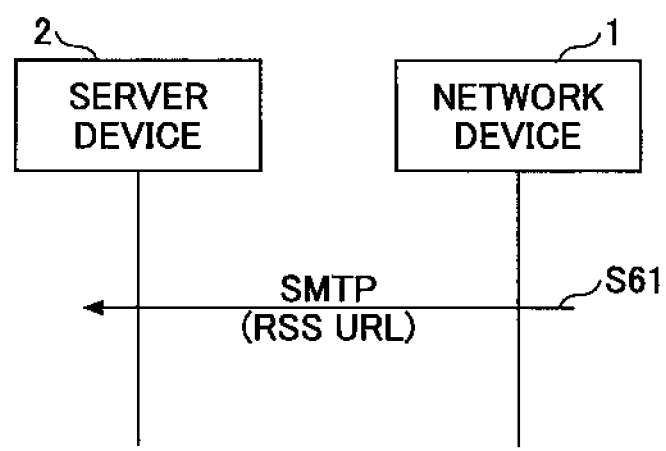
FIG. 17 is a sequence diagram showing further another exemplary procedure for sending an RSS URL from a network device to a server device.

FIG. 17 is a sequence diagram showing further another exemplary procedure for sending an RSS URL from the network device 1 to the server device 2. The procedure shown in the sequence diagram of FIG. 17 is used in Step S2 of FIG. 8 or Step S15 of FIG. 9. An SMTP server is activated in the server device 2 in order to receive the RSS URL.

Figure 18:
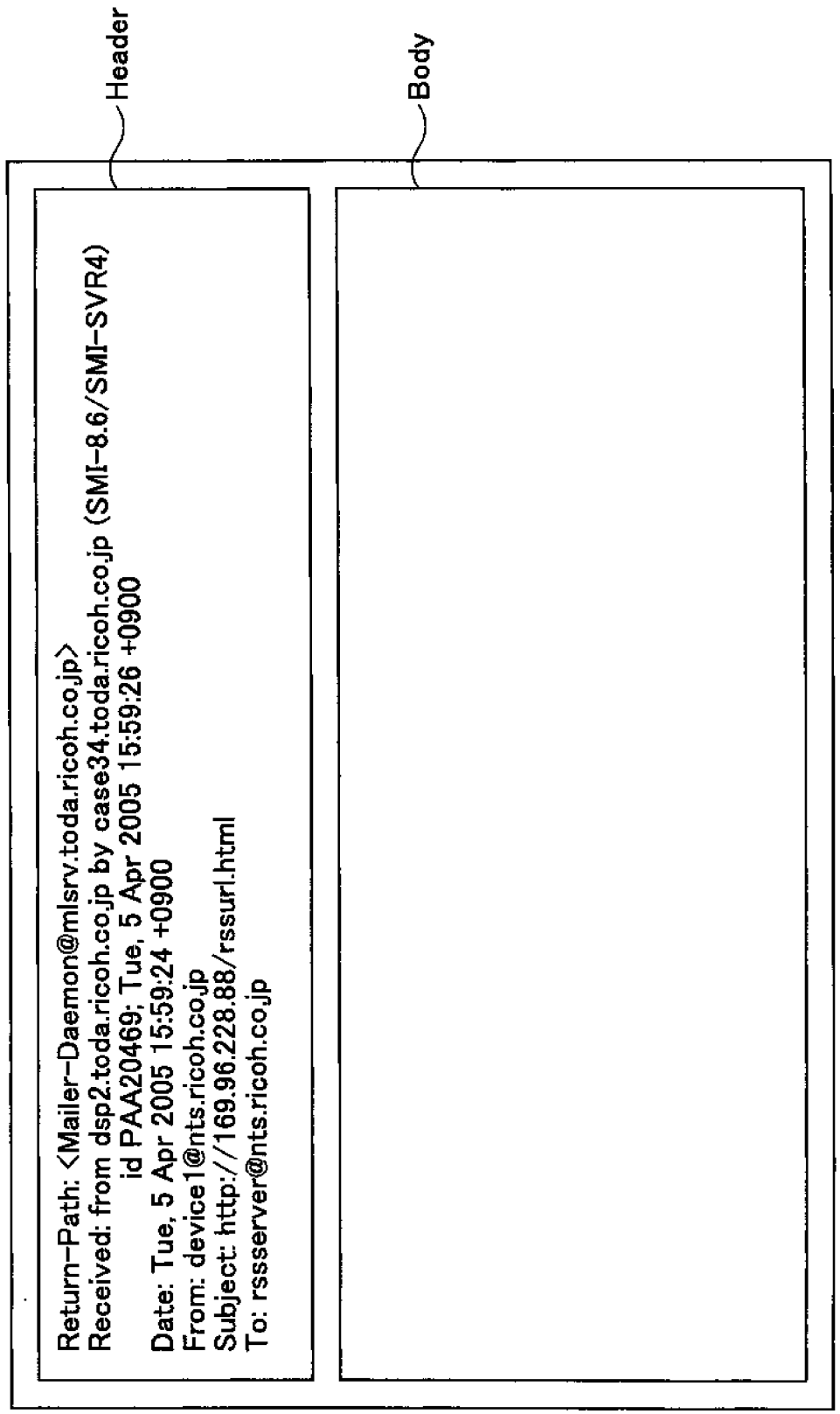
FIG. 18 is a diagram showing an example of a configuration of mail information sent from a network device to a server device.

In Step S61 the network device 1 sends the RSS URL to the server device 2 based on SMTP. FIG. 18 is a diagram showing an example of a configuration of mail information sent from the network device 1 to the server device 2. The mail information shown in FIG. 18 contains an RSS URL "http://169.96.228.88/rssurl.html" in the subject of mail.

In this way the RSS URL can be sent from the network device 1 to the server device 2 as the subject of mail based on SMTP.

Figure 19:
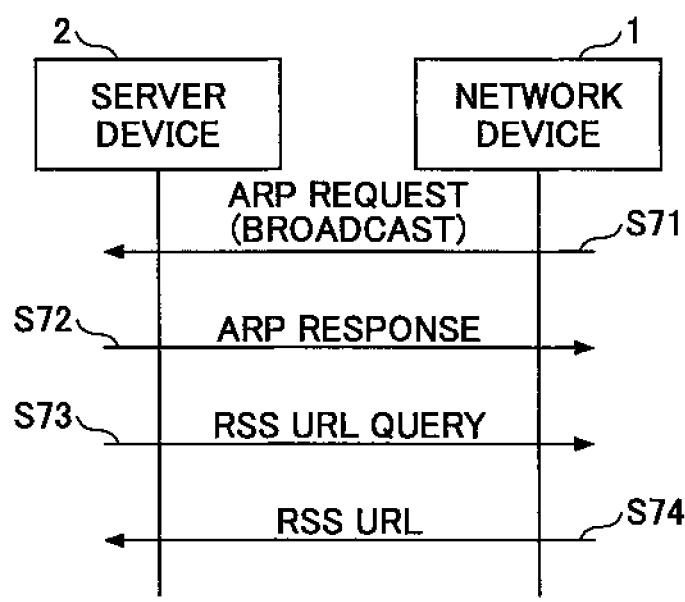
FIG. 19 is a sequence diagram showing an exemplary procedure for sending an RSS URL from a network device to a server device.

FIG. 19 is a sequence diagram showing an exemplary procedure for sending an RSS URL from the network device 1 to the server device 2. The server device 2 detects an ARP request from the network device 1.

The network device 1 executes the operation shown in the sequence diagram of FIG. 19 when connected to the LAN 4, for example. In Step S71 the network device 1 broadcasts an Address Resolution Protocol (ARP) request. In Step S72 the server device 2 that has detected the ARP request sends an ARP response to the network device 1 which originated the ARP request.

In Step S73 the server device 2 queries the network device 1, the source of the ARP request, for an RSS URL. The above-described SOAP I/F, REST I/F, or the like may be used in querying for the RSS URL. In Step S74 the network device 1 returns an RSS URL as a response to the query.

According to the sequence diagram of FIG. 19, after sending the ARP response to the network device 1 which originated the ARP request, the server device 2 queries the source of the ARP request for an RSS URL and thus automatically acquires the RSS URL of the network device 1 connected to the LAN 4.

(Updating a Management Table)

Figure 20:
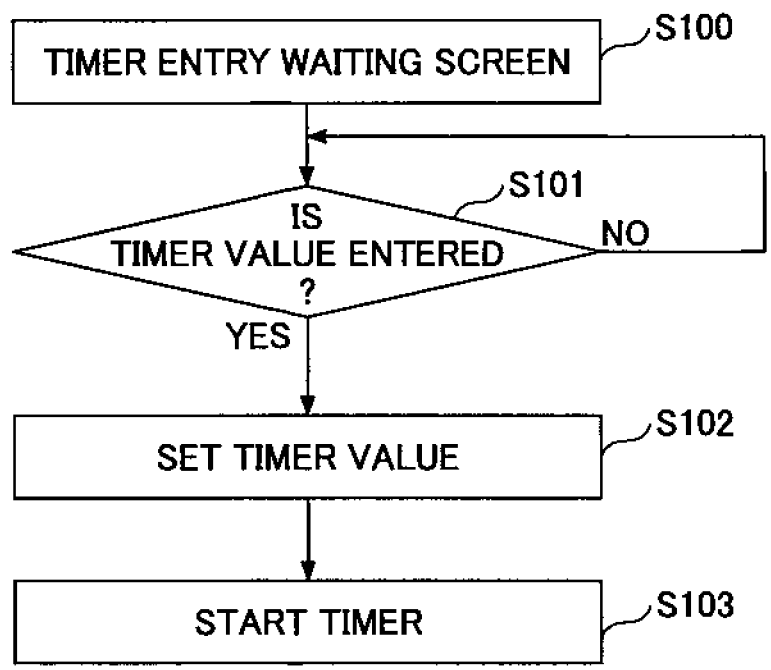
FIG. 20 is a flowchart showing an example of processing by a server device using a timer.

The server device 2 includes a management table managing the network devices 1 to be managed. The server device 2 updates the management table as described below. FIG. 20 is a flowchart showing an example of processing by the server device 2 using a timer.

The processing shown in the flowchart of FIG. 20 is executed after the IT manager selects a timer entry screen, for example. In Step S100 the server device 2 displays the timer entry screen. The device-specific hardware 404 of FIG. 5 is used for timer entry.

In Step S101 the server device 2 determines whether a timer value has been entered. The operation in Step S101 is repeated until a timer value is entered. If a timer has been activated, then in Step S102, the server device 2 sets the timer value. In Step S103 the server device 2 starts the timer.

Figure 21:
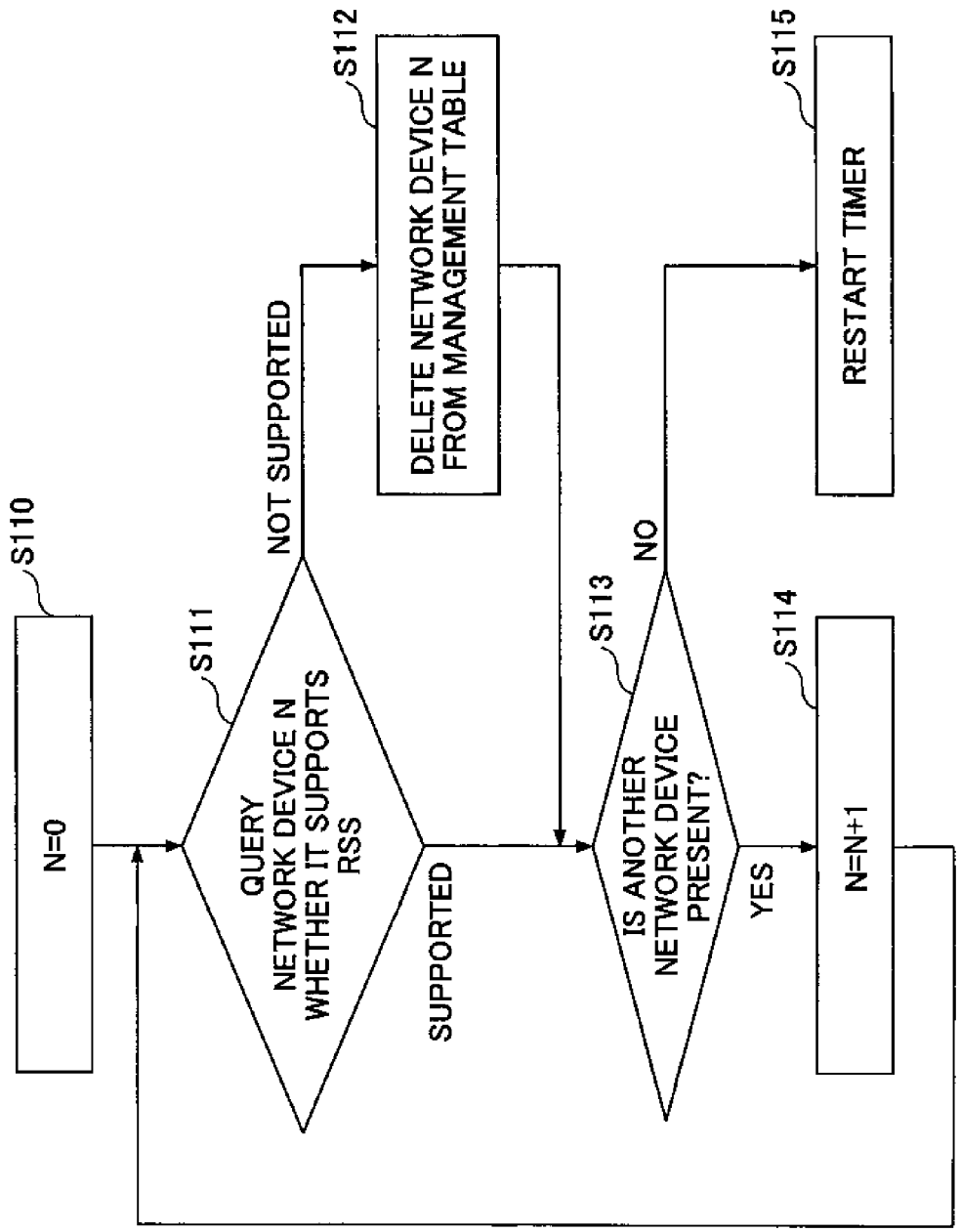
FIG. 21 is a flowchart showing an example of a management table update operation.

When the timer reaches the set timer value, the server device 2 executes an operation shown in the flowchart of FIG. 21. FIG. 21 is a flowchart showing an example of a management table update operation.

In Step S110, the server device 2 sets N, a network device 1 identifier, to 0. In Step S111 the server device 2 queries the network device 1 corresponding to N whether the network device 1 corresponding to N supports RSS.

If the network device 1 corresponding to N does not support RSS, the process proceeds to Step S112 wherein the server device 2 deletes the network device 1 corresponding to N from the management table. Then the process proceeds to Step S113. On the other hand, if the network device 1 corresponding to N supports RSS, the process proceeds to Step S113.

In Step S113 the server device 2 determines whether another network device 1 is present. If another network device 1 is present, then in Step S114 N is incremented by 1. Then the process returns to Step S111. On the other hand, if another network device 1 is not present, then in Step S115 the server device 2 restarts the timer.

Figure 22:
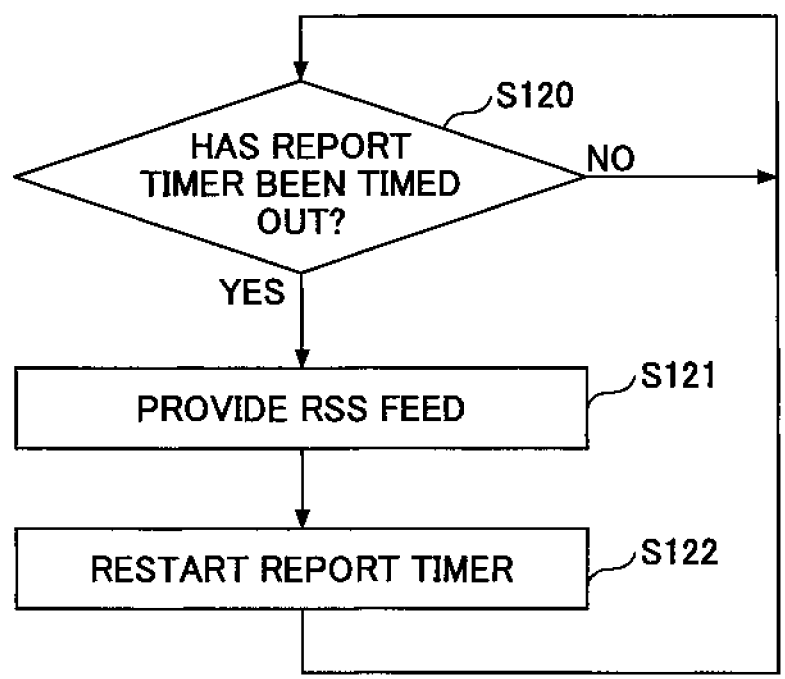
FIG. 22 is a flowchart showing an example of processing by a network device using a report timer.

FIG. 22 is a flowchart showing an example of processing by the network device 1 using a report timer. The report timer is activated in the same manner as in the case of the timer of the server device 2 described with reference to FIG. 20.

In Step S120 the network device 1 determines whether the report timer has timed out. The operation in Step S120 is repeated until the network device 1 determines that the report timer has timed out. If the network device 1 determines that the report timer has timed out, then in Step S121 the network device 1 provides an RSS feed to the server device 2. In Step S122 the network device 1 restarts the report timer. Then the process returns to Step S120. With the processing using the report timer shown in FIG. 22, the network device 1 can provide the RSS feed to the server device 2 every time the report timer times out.

Figure 23:
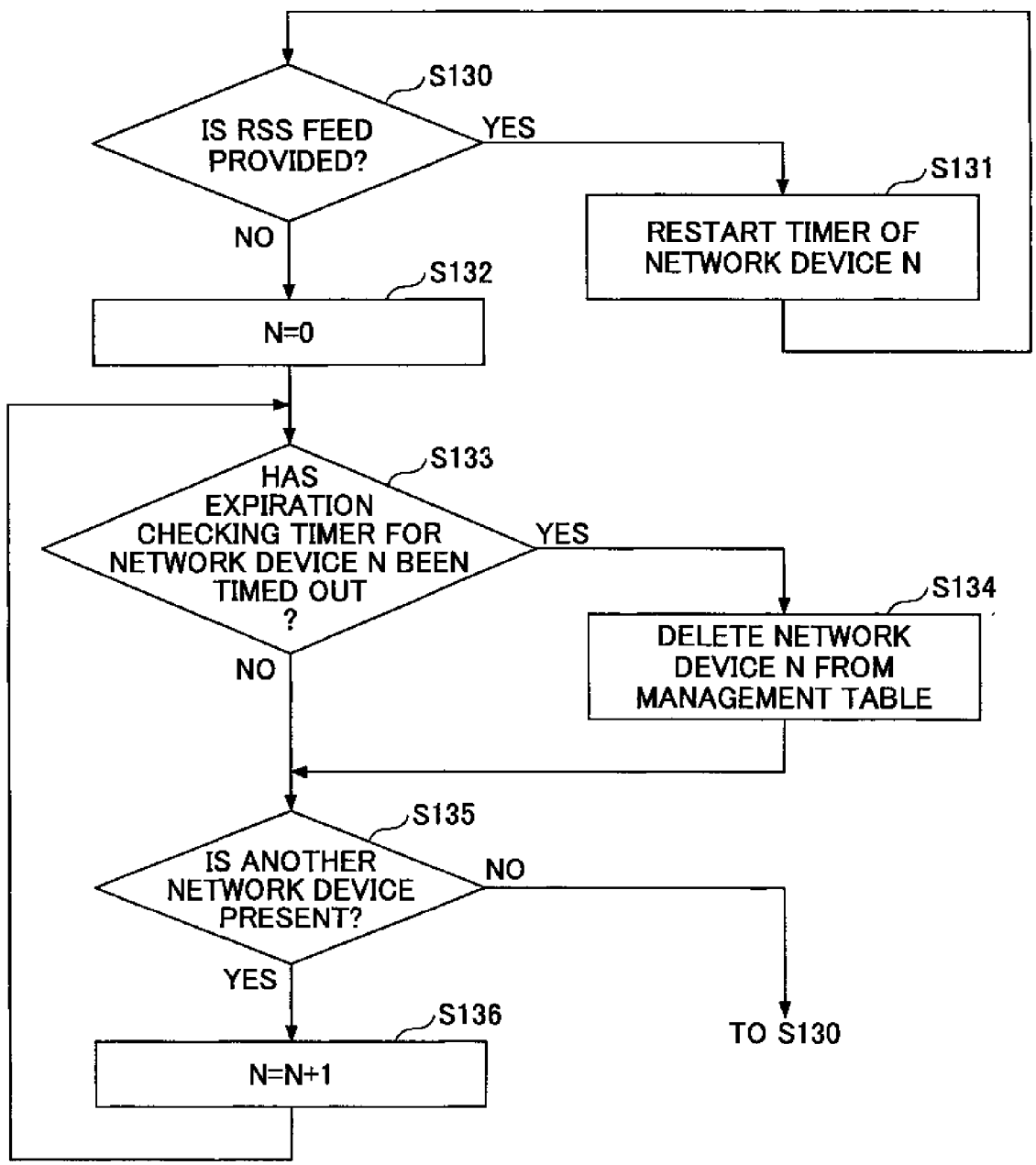
FIG. 23 is a flowchart showing an example of a management table update operation.

FIG. 23 is a flowchart showing an example of a management table update operation. In Step S130 the server device 2 determines whether an RSS feed has been provided from the network device 1. If an RSS feed has been provided from the network device 1, then in Step S131 the server device 2 restarts a timer of the network device 1 corresponding to N which has provided the RSS feed. Then the process returns to Step S130.

On the other hand, if an RSS feed has not been provided from the network device 1, then in Step S132 the server device 2 sets N, a network device 1 identifier, to 0. In Step S133 the server device 2 determines whether an expiration checking timer for the network device 1 corresponding to N has timed out.

If the server device 2 determines that the expiration checking timer for the network device 1 corresponding to N has timed out, the process proceeds to Step S134 wherein the server device 2 deletes the network device 1 corresponding to N from the management table. Then the process proceeds to Step S135. On the other hand, if the server device 2 determines that the expiration checking timer for the network device 1 corresponding to N has not yet timed out, the process proceeds to Step S135.

In Step S135 the server device 2 determines whether another network device 1 is present. If another network device 1 is present, then in Step S136 N is incremented by 1. Then the process returns to Step S133. On the other hand, if another network device 1 is not present, the process returns to Step S130.

For example, in the case where the report timer is set to 10 minutes and the expiration checking timer is set to 60 minutes, the expiration timer does not time out in Step S133 as long as the network device 1 is activated. Accordingly, the network device 1 continues to be managed.

(Storing RSS Feeds in an OPML Format)

Figure 24:
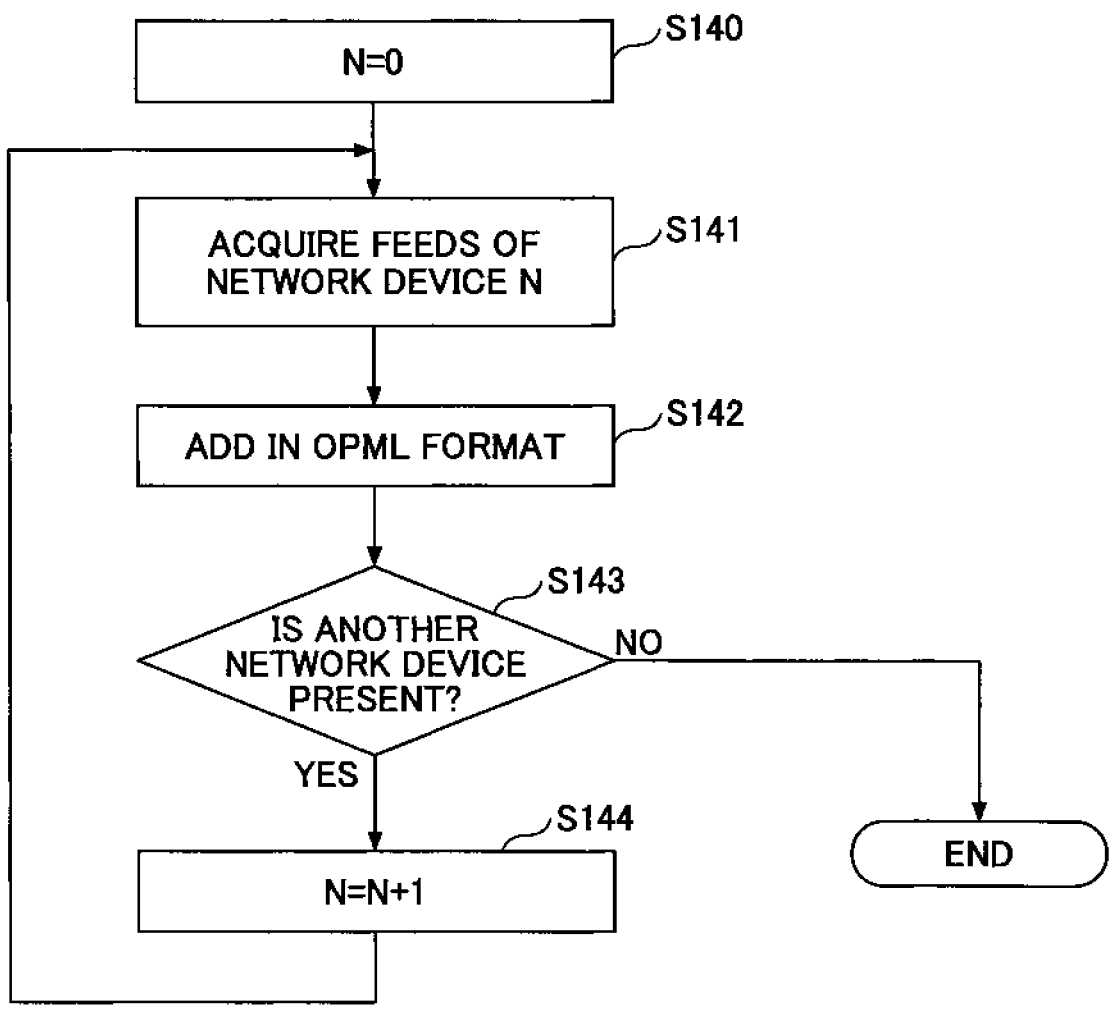
FIG. 24 is a flowchart showing an example of processing for storing RSS feeds in an OPML format.

The server device 2 can store the RSS feeds of the network devices 1 to be managed in an OPML format. FIG. 24 is a flowchart showing an example of processing for storing the RSS feeds in an OPML format.

In Step S140 the server device 2 sets N, a network device 1 identifier, to 0. In Step S141 the server device 2 acquires the RSS feed of the network device 1 corresponding to N. In Step S142 the server device 2 adds the acquired RSS feed of the network device 1 in an OPML format.

In Step S143 the server device 2 determines whether another network device 1 is present. If another network device 1 is present, then in Step S144 N is incremented by 1. Then the process returns to Step S141. On the other hand, if another network device 1 is not present, the processing shown in the flowchart of FIG. 24 ends.

FIG. 25 is an example of RSS feeds acquired from plural network devices and stored in an OPML format. The example of FIG. 25 supports four types of RSS feeds, namely, device status, toner level, paper feed tray status, and communication history.

(Storing the RSS Sources)

Figure 26:
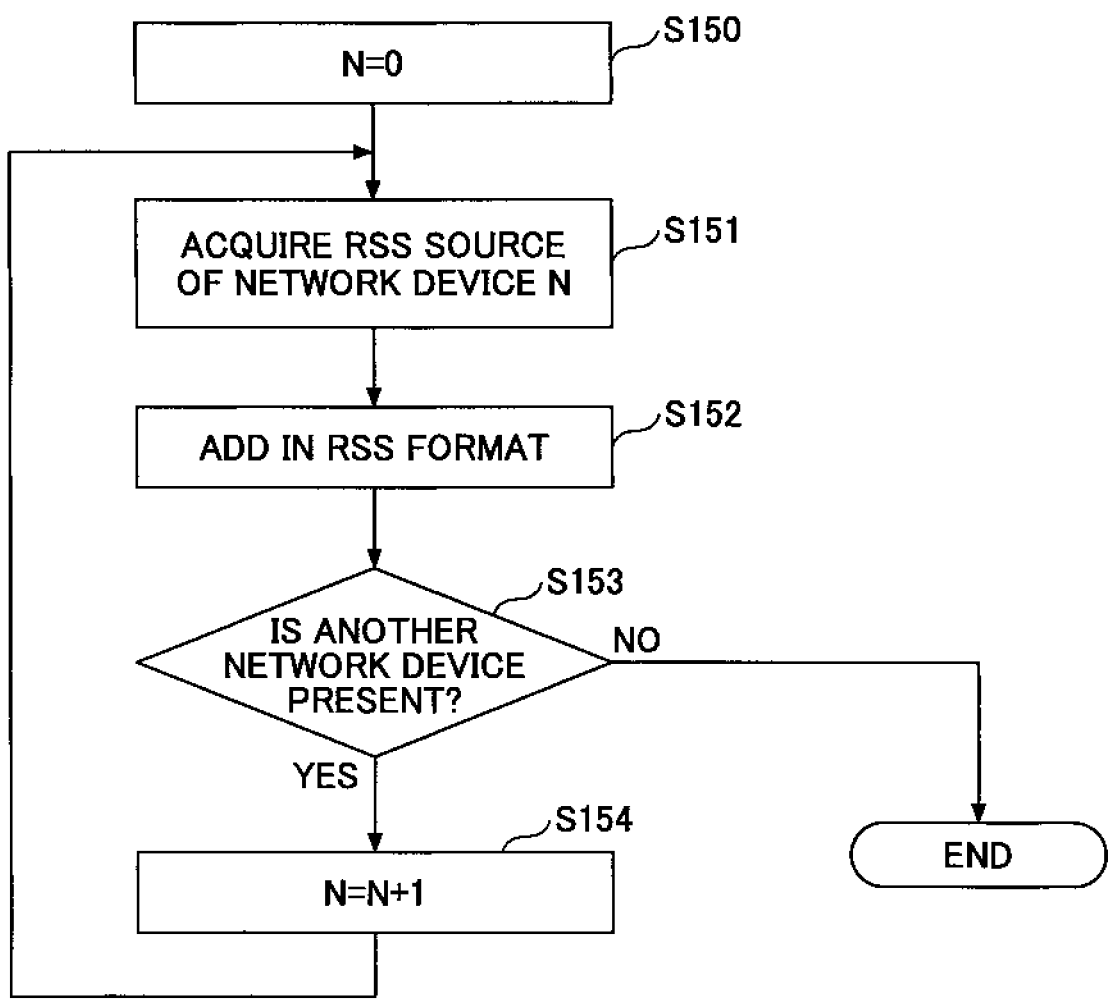
FIG. 26 is a flowchart showing an example of the processing for storing RSS sources.

The server device 2 can acquire the RSS sources from corresponding RSS feeds of the network devices 1 to be managed and store the RSS sources in an RSS format. FIG. 26 is a flowchart showing an example of processing for storing the RSS sources.

In Step S150 the server device 2 sets N, a network device 1 identifier, to 0. In Step S151 the server device 2 acquires the RSS source of the network device 1 corresponding to N. In Step S152 the server device 2 adds the acquired RSS source of the network device 1 in an RSS format.

Figure 27:
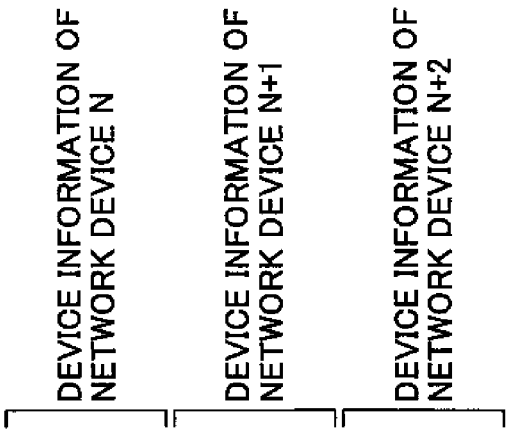
FIG. 27 is an example of acquired RSS sources of plural network devices stored in an RSS format.

In Step S153 the server device 2 determines whether another network device 1 is present. If another network device 1 is present, then in Step S114 N is incremented by 1. Then the process returns to Step S151. On the other hand, if another network device 1 is not present, the processing shown in the flowchart of FIG. 26 ends. FIG. 27 is an example of the acquired RSS sources of plural network devices 1 stored in an RSS format.

(Providing RSS Feed by the Server Device 2)

The server device 2 can provide not only the device management information but also other information (e.g. company news) as an RSS feed. The server device 2 can import information of the RSS sources of external general servers and provide the imported RSS source information.

FIG. 28 illustrates an example of a screen displayed by an RSS reader, showing an RSS feed provided by the server device 2. The screen of FIG. 28 shows company news provided by the server device 2, plural sets of device management information provided by plural network devices 1, and economic and IT news provided by external general servers.

The present invention is not limited to the above-described embodiments, and variations and modifications may be made without departing from the scope of the invention.

The present application is based on Japanese Priority Application No. 2006-350481 filed on Dec. 26, 2006, with the Japanese Patent Office, the entire contents of which are hereby incorporated by reference.

What is claimed is:

1. A server device including a processor and a program storage device tangibly embodying a program of instructions executable by the processor to configure the server device to provide a client device with location information indicating one or more data storage locations of one or more sets of information about one or more datasets, the one or more sets of information about the one or more datasets being provided by one or more network devices and described in a structured format, the server device including a module comprising:

a first software layer including plural kinds of applications, each kind of application amongst the plural kinds of applications having and performing a function different from a function of the others of the plural kinds of applications, and a second software layer including plural kinds of service software used in common for the functions of the plural kinds of applications and controls hardware of the server device to provide said each kind of application amongst the plural kinds of applications with the different function;

a data storage location acquiring unit to acquire the location information indicating the data storage locations of the sets of information about the datasets from the corresponding network devices via the second software layer;

a data storage location management unit to manage the data storage locations of the sets of information about the datasets acquired from the network devices;

a data storage location providing unit to provide the client device with the acquired location information indicating the data storage locations of the sets of information about the datasets via the second software layer, wherein the data storage location providing unit describes the data storage location of the set of information about the dataset in a subject of a mail to provide the client device with the data storage location of the set of information about the dataset.

2. The server device as claimed in claim 1, further comprising:

a management table unit for managing information indicating specific network devices being managed or to be managed; and a deleting unit to determine whether a specific network device supports the structured format and, if said deleting unit determines the specific network device does not support the format, deletes the specific network device from the information in the management table unit indicating the specific network devices being managed or to be managed.

3. The server device as claimed in claim 1, further comprising:

a management table unit for managing information indicating specific network devices being managed or to be managed; and a deleting unit to delete the specific network device from the information in the management table unit indicating the specific network devices being managed or to be managed, if a specific network device does not provide, for a predetermined time period, the location information indicating the data storage location.

4. The server device as claimed in claim 1, wherein the data storage location acquiring unit acquires device management information via the second software layer, and the location information provided by the data storage location providing unit via the second software layer to the client device includes the data storage locations of the device management information acquired by the data storage location acquiring unit.

5. A network device including a processor and a program storage device tangibly embodying a program of instructions executable by the processor to configure the network device to provide a set of information about a dataset in a structured format, said network device including a module comprising:

a first software layer including plural kinds of applications, each kind of application amongst the plural kinds of applications having and performing a function different from a function of the others of the plural kinds of applications, and a second software layer including plural kinds of service software used in common for the functions of the plural kinds of applications and controls hardware of the network device to provide said each kind of application amongst the plural kinds of applications with the different function;

a specifying unit to specify a specific server device for providing a client device with location information indicating a data storage location of the set of information about the dataset; and a providing unit to provide, via the second software layer, the specific server device with the location information indicating the data storage location of the set of information about the dataset, wherein the specifying unit specifies an assigning server device to assign an address to the network device as the specific server device for providing the client device with the location information indicating the data storage location of the set of information about the dataset, and wherein the providing unit describes the data storage location of the set of information about the dataset in a subject of a mail to provide the server device with the data storage location of the set of information about the dataset.

6. The network device as claimed in claim 5, wherein the specifying unit specifies the assigning server device based on an address of the assigning server device, the address having been previously registered in the network device.

7. The network device as claimed in claim 5, wherein the specifying unit specifies the assigning server device based on a unique name of the assigning server device, the unique name having been previously registered in the network device.

8. The network device as claimed in claim wherein the providing unit uses a SOAP interface to provide the server device with the data storage location of the set of information about the dataset.

9. The network device as claimed in claim 5, wherein the providing unit uses a REST interface to provide the server device with the data storage location of the set of information about the dataset.

10. The network device as claimed in claim 5, wherein the providing unit describes the data storage location of the set of information about the dataset in a body of a mail to provide the server device with the data storage location of the set of information about the dataset.

11. A method for use by a server device to provide a client device with location information indicating one or more data storage locations of one or more sets of information about one or more datasets, the one or more sets of information about the one or more datasets being provided by one or more network devices and described in a structured format, the method comprising:

configuring the server device with a first software layer including plural kinds of applications, each kind of application amongst the plural kinds of applications having and performing a function different from a function of the others of the plural kinds of applications, and a second software layer including plural kinds of service software used in common for the functions of the plural kinds of applications and controls hardware of the server device to provide said each kind of application amongst the plural kinds of applications with the different function;

a data storage location acquiring step of acquiring the location information indicating the data storage locations of the sets of information about the datasets from the corresponding network devices via the second software layer;

a data storage location management step of managing the data storage locations of the sets of information about the datasets acquired from the network devices;

a data storage location providing step of providing the client device with the location information indicating the acquired data storage locations of the sets of information about the datasets via the second software layer;

wherein the data storage location providing step describes the data storage location of the set of information about the dataset in a subject of a mail to provide the server device with the data storage location of the set of information about the dataset.

* * * * *